Feb. 5, 1935.  W. F. EPPENSTEINER  1,989,852
METHOD OF SWEATING OUT FUSIBLE METALS
Filed Aug. 4, 1933
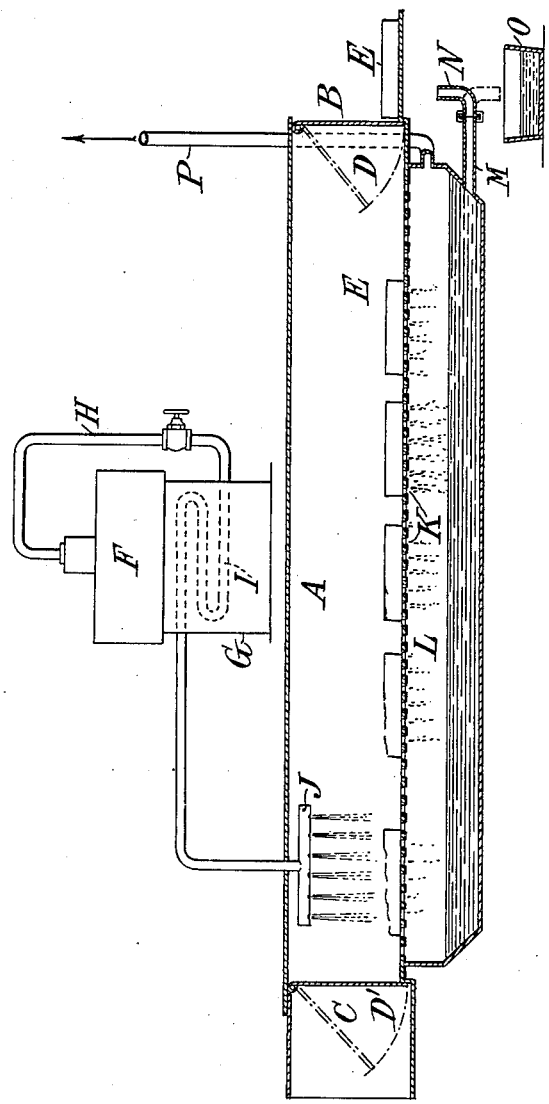
INVENTOR
William F. Eppensteiner
BY
Fraser, Myers & Manley
ATTORNEYS.

Patented Feb. 5, 1935

1,989,852

UNITED STATES PATENT OFFICE 1,989,852

METHOD OF SWEATING OUT FUSIBLE METALS

William F. Eppensteiner, Rahway, N. J., assignor to The American Metal Company, Limited, New York, N. Y., a corporation of New York Application August 4, 1933, Serial No. 683,657

3 Claims. (Cl. 148—5)

This invention relates to the separation of the more readily fusible metals from those of lesser fusibility by the application of heat. An example of such sweating treatment is the melting out of solder from used automobile radiators. The method is applicable to various metallic structures, the parts of which are united by solder, such as to the separation of lead coating from electric wires, and in numerous other instances where a more fusible metal or alloy is to be separated from a less fusible metal or alloy. The method commonly heretofore employed has been to place the material to be treated in an oven or retort and subject it to the heat of combustion applied either externally or internally thereof, the more fusible metal or alloy falling into a receiver or tray beneath, while the less fusible metal or alloy is pushed out or otherwise removed from the container.

According to the present invention the heating medium used is superheated steam, whereby a much higher recovery of fusible metal is obtained, and the oxidation of the metals under treatment, and the production of dross, are reduced to the minimum.

For illustration of the method, reference may be made to the accompanying drawing, which illustrates diagrammatically a simple apparatus adapted for practising the method.

In the drawing, A designates a heating chamber having an inlet at B and an outlet at C. The inlet and outlet may be closed by doors D, D', or other closures, which may be opened to admit the objects to be treated,—one of which is designated at E,—and to discharge the treated objects or material from which the more fusible metal has been separated. F is a boiler, which may be heated by a furnace G and from which steam is taken through a pipe H and carried in a superheating coil I through the furnace G, being introduced into the heating chamber through a nozzle J having perforations for the escape of the superheated steam.

Assuming that automobile radiators or the like are to be treated to melt out the solder, these rest within the chamber A on a grating K, through which the solder may drip into a trough or tray L, from which at intervals it may be drawn off through a spout M by turning its gooseneck N down to the position shown in dotted lines, whereby the solder is run into the collecting vessel O. The waste steam may be discharged through pipe P, so that the steam pressure within the chamber is not high.

In operation the steam may be generated at any suitable pressure,—say, for example, 150 pounds per square inch,—and in its flow through the superheater it may be raised to a temperature sufficient to impart the necessary heat for fusing out the solder or other fusible metal,—say, for example, from 750° to 850° F. or 1000° F. The steam thus superheated is sprayed into the heater chamber, where it flows into contact with the articles to be treated, its temperature being sufficient to melt out the more readily fusible metal or alloy to be recovered, but insufficient to affect the other metal or metals of the objects under treatment. The objects may be stirred or agitated in any suitable way for disengaging the solder or other fusible metal.

The process may be practiced continuously by introducing the objects or matters to be treated at the inlet end of the chamber, causing them to move progressively through the chamber while subjected to the action of the super-heated steam, and finally ejecting them through the outlet end of the chamber. The infeeding, progressive movement, and outfeeding, of the objects or matters to be treated and of the residual material may be accomplished by any means heretofore known in heating chambers, ovens or furnaces of this general type, and forms no part of the present invention. Such means include any pushing, feeding, conveying or agitating devices such as have been heretofore employed for analogous purposes.

The experience thus far had with this method has resulted in the recovery of approximately twice the proportion of solder recovered by the process using heat of combustion within the heating chamber. It has an important further advantage in diminishing oxidation. Tests heretofore made indicate that by the method commonly heretofore employed it is impossible entirely to exclude air, which is very chemically active at the sweating temperature, especially with tin and lead, with which its oxygen combines to produce dross. The production of dross is further increased in many instances, as with automobile radiators, due to the extended area of solder seams or joints. By using superheated steam, air is excluded practically entirely and the production of dross is reduced to the minimum. With automobile radiators some air is inevitably introduced because of being contained in the cellular spaces or interstices of the radiator structure, but when the method is carefully practiced, that is practically the only air which is admitted to the chamber. By excluding air I also prevent the oxidation of the higher melting point metals present, such as copper, and therefore the metal or alloy sweated out and the dross produced are not contaminated to as great a degree as by the method heretofore employed.

Recent tests on the composition of the sweater atmosphere show the following results:

| | Percent by volume |
|---|---|
| $CO_2$ | 0.252 |
| $CO$ | 0.012 |
| $O$ | 0.124 |
| $N$ | 1.743 |
| $H_2O$ | 97.87 (steam) | which demonstrates how effectively air is excluded.

The described process is applicable not only for recovering solder from radiators, but also for melting lead out of electrotype sheets and from lead-covered electric cables and other analogous purposes, as well as for treating dross produced in the refining of solder and lead, and various other instances where a more highly fusible metal or alloy or other substance is to be recovered from a metal or other material of lesser fusibility.

I claim as my invention:

1. The process of removing solder or the like from automobile radiators or similar articles which consists in moving such article into and through a substantially closed chamber and without other material heating means fusing out the solder or the like from such articles by flooding the chamber with superheated steam in direct contact with the articles being treated, such steam being at low pressure, and excluding from said chamber any substantial quantities of air so that the articles being treated are subjected only to the superheated steam during their transit through the chamber.

2. The process of claim 1 in which the superheated steam is introduced near the discharge end of the chamber, and passes through an exit pipe near the entrance of the chamber of sufficient diameter to prevent the building up of any considerable pressure in the chamber, but nevertheless creating sufficient pressure to exclude the air during the charging and discharging movements of the radiators.

3. The process of claim 1 in which the radiators or the like are subjected to agitation while the solder or the like is in fused condition.

WILLIAM F. EPPENSTEINER.